United States Patent
Gneuss et al.

(10) Patent No.: US 10,065,355 B2
(45) Date of Patent: Sep. 4, 2018

(54) METHOD AND APPARATUS FOR OPERATING A SCREENING WHEEL FILTER

(71) Applicant: GNEUSS GmbH, Bad Oeynhausen (DE)

(72) Inventors: Detlef Gneuss, Bad Oeynhausen (DE); Stephan Gneuss, Bad Oeynhausen (DE); Daniel Gneuss, Charlotte, NC (US)

(73) Assignee: GNEUSS GMBH, Bad Oeynhausen (DE)

( * ) Notice: Subject to any disclaimer, the term of this patent is extended or adjusted under 35 U.S.C. 154(b) by 353 days.

(21) Appl. No.: 14/772,460

(22) PCT Filed: May 5, 2014

(86) PCT No.: PCT/EP2014/059088
§ 371 (c)(1),
(2) Date: Sep. 29, 2015

(87) PCT Pub. No.: WO2014/180776
PCT Pub. Date: Nov. 13, 2014

(65) Prior Publication Data
US 2016/0059465 A1    Mar. 3, 2016

(30) Foreign Application Priority Data
May 10, 2013   (DE) .......................... 10 2013 208 637

(51) Int. Cl.
*B29C 47/08*   (2006.01)
*B29C 47/68*   (2006.01)
*B29C 47/92*   (2006.01)

(52) U.S. Cl.
CPC ........ *B29C 47/0886* (2013.01); *B29C 47/683* (2013.01); *B29C 47/92* (2013.01);
(Continued)

(58) Field of Classification Search
CPC .................................................. B29C 47/0886
See application file for complete search history.

(56) References Cited

U.S. PATENT DOCUMENTS

| 3,146,494 A | 9/1964 | Sponaugle |
| 4,486,304 A | 12/1984 | Neuman |

(Continued)

FOREIGN PATENT DOCUMENTS

CH    593786 B    12/1997

*Primary Examiner* — Benjamin A Schiffman
(74) *Attorney, Agent, or Firm* — Andrew Wilford

(57) ABSTRACT

A method and an apparatus for operating a screening wheel filter for high-viscosity melts with pressures of >10 bar and temperatures of >90° C., wherein a screening wheel (1) is rotationally driven step by step, and screening inserts (2) arranged in the screening wheel (1) are successively subjected to a stream of cleaning agent produced by a cleaning agent drive (9) in a backflushing cleaning station, are to be optimized in such a way that less cleaning agent is used, better cleaning of the screening inserts takes place and a saving of energy is ensured. For this purpose it is proposed that the cleaning backflushing in the backflushing cleaning station takes place during the rotation of the screening wheel (1), wherein an open-loop or closed-loop control device (7) assigned to the cleaning agent drive (9) is used to set the amount of cleaning agent and/or the pressure of the cleaning agent and/or the flow rate of the cleaning agent in dependence on the rotational speed of the screening wheel (1) and/or in dependence on a differential pressure prevailing at the screening inserts (2) located in the melt channel (4) and the effective opening of the slot die normal to the radial is less than the distance covered by the screening wheel (1) during a driving step.

4 Claims, 1 Drawing Sheet

(52) U.S. Cl.
CPC .. *B29C 47/0884* (2013.01); *B29C 2947/9259* (2013.01); *B29C 2947/9299* (2013.01); *B29C 2947/92514* (2013.01); *B29C 2947/92961* (2013.01)

(56) References Cited

U.S. PATENT DOCUMENTS

| | | |
|---|---|---|
| 5,090,087 A | 2/1992 | Gneuss |
| 5,090,887 A | 2/1992 | Gneuss |
| 5,227,048 A | 7/1993 | Seibel |
| 6,153,093 A * | 11/2000 | Bentivoglio ........ B29C 47/0815 210/107 |
| 6,325,922 B1 | 12/2001 | Schaller |
| 6,843,915 B2 | 1/2005 | Gneuss |
| 7,411,163 B2 | 8/2008 | Gneuss |
| 7,976,706 B2 | 7/2011 | Gneuss |
| 8,202,423 B2 | 6/2012 | Gneuss et al. |
| 2003/0132146 A1 | 7/2003 | Gneuss |
| 2003/0230527 A1* | 12/2003 | Gneuss ............... B29C 47/0886 210/391 |
| 2013/0270170 A1 | 10/2013 | Jost et al. |
| 2014/0001111 A1* | 1/2014 | Middler ................ B29C 47/081 210/393 |
| 2014/0332460 A1 | 11/2014 | Woestmann |

* cited by examiner

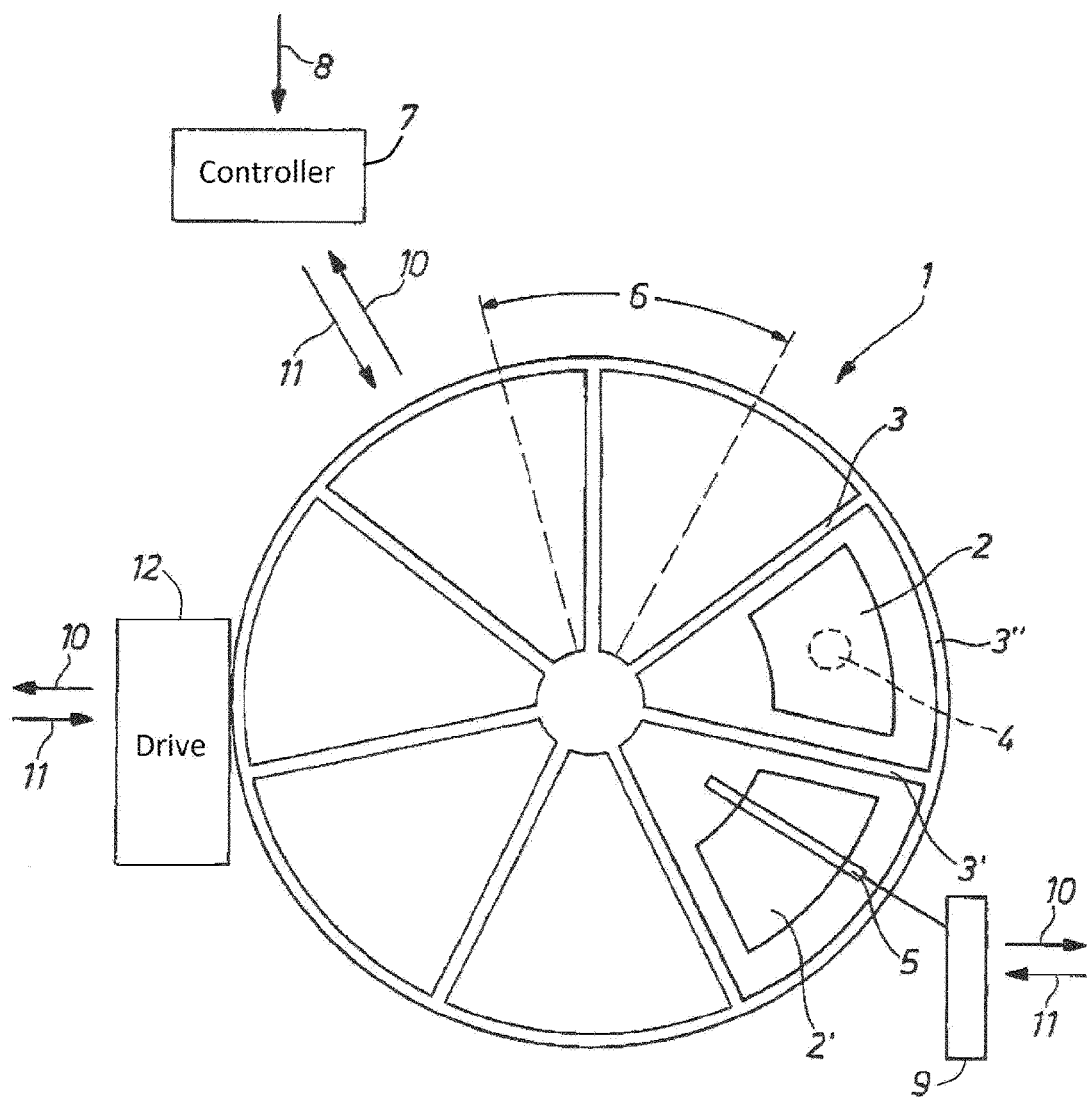

METHOD AND APPARATUS FOR OPERATING A SCREENING WHEEL FILTER

CROSS REFERENCE TO RELATED APPLICATIONS

This application is the US-national stage of PCT application PCT/EP2014/059088 filed 5 May 2014 and claiming the priority of German patent application 102013208637.7 itself filed 10 May 2013.

FIELD OF THE INVENTION

The invention relates to a method of operating a sieve-wheel filter for high-viscosity melts with pressures of >10 bar and temperatures of >90° C., the sieve wheel being rotated in steps and mesh inserts arranged in the sieve wheel in a back-flushing station being successively traversed by a stream of cleaning agent generated by a cleaning-agent supply, as well as to a sieve-wheel filter for executing the method.

BACKGROUND OF THE INVENTION

Sieve-wheel filters with a corresponding back-flushing station belong to the prior art as presented, for example, by DE 103 26 487 [U.S. Pat. No. 7,411,163]. In such sieve-wheel filters, mesh inserts located in the melt conduit are rotated away from the melt conduit via a drive that acts on the sieve wheel and switched with cleaned mesh inserts. The back-flush cleaning station lies as close as possible upstream of the melt conduit in the direction of rotation; during filter operation in the back flush cleaning station, i.e., when the sieve wheel is stationary, the mesh insert located in the back-flushing station is traversed with cleaning agent by a stream generated in the cleaning-agent supply.

The back-flushing station is operated during down times of the filter wheel. Here, a portion of clean melt from the already-cleaned melt flow is fed to the cleaning-agent supply, here a shootback plunger, in the back-flushing station. Upon actuation of the shootback plunger, the melt—which acts as a cleaning agent—is forced through the mesh insert. The mesh insert is traversed by the cleaning agent counter to the usual sieve-flow direction, taking contaminants that have collected on the mesh insert along with it and then guiding them toward an outlet. After cleaning of the mesh insert, it can be rotated a step further and moved to alignment with the melt conduit.

To enable complete cleaning of the mesh insert when the sieve wheel is at a standstill, the size of the back-flush nozzle corresponds at least to the angular dimension of a single rotation step.

In this regard, it is disadvantageous that, given the required size of the back-flush nozzle, large quantities of cleaning agents are required in order to saturate the mesh insert over the required width with the cleaning agents. Particularly at edges of the mesh inserts, insufficient cleaning often occurs because the melt pressure of the back-flushing station is often no longer sufficient there.

DE 39 02 061 [U.S. Pat. No. 5,090,887] discloses a screening device for cleaning plastic melts in which, during rotation of the sieve wheel, cleaning is performed of the mesh inserts located in the back-flushing station. Advanced by the pressure prevailing in the melt conduit, the already cleaned melt flows through the mesh inserts counter to the usual filter-flow direction. A cleaning-agent supply is not proposed. Effective, melt-saving cleaning is not possible.

According to CH 593 786, the already cleaned melt flows constantly through the mesh inserts as a result of the pressure prevailing in the melt conduit. Here, too, no actively functioning cleaning-agent supply is provided. As a result of the continuous cleaning process, an especially large amount of the cleaning agent, i.e. the melt, is wasted.

OBJECT OF THE INVENTION

It is the object of the invention to optimize the back flushing and cleaning of mesh inserts in such a way that less cleaning agent is wasted, better cleaning of the mesh inserts occurs, and energy savings is ensured.

SUMMARY OF THE INVENTION

To achieve this object, according to the method the back flushing in der back-flushing station is carried out during rotation of the sieve wheel, the quantity and/or the pressure and/or the flow speed of the cleaning agent being adjusted via a controller working with or without feedback and connected to the cleaning-agent supply as a function of the temporal course of the rotation of the sieve wheel and/or as a function of the rotational speed of the sieve wheel and/or as a function of a differential pressure across the mesh insert in the melt conduit.

This way, during the back-flushing process, the back-flush nozzle is always facing new regions of the mesh insert to be cleaned, thus enabling better cleaning even at the edges of the mesh insert.

What is more, in the known sieve-wheel filters, the sieve wheel must always be rotationally driven against the pressure that has built up in the melt conduit. That is, the sieve wheel is pressed by the melt against an inner face of the housing of the sieve-wheel filter, whereby adhesions and/or tilting of the sieve wheel in the sieve wheel housing can occur, and the frictional resistance between sieve wheel and sieve wheel housing inner surface is increased substantially in any case.

According to the invention, counterpressure against the sieve wheel occurs during rotation of the sieve wheel as a result of the simultaneous back-flushing process, whereby less force is required to drive the sieve wheel. Even in the case of poorly lubricating melts, the resistance between sieve wheel and housing wall of the sieve-wheel filter is reduced substantially, thus avoiding blockages. By adjusting the quantity and/or the pressure and/or the flow speed of the cleaning agent, which can be varied individually or in combination during rotation, optimum and resource-saving cleaning can be performed.

Depending on what materials are being processed, it is possible according to the invention to react to their specific characteristics and desired rotational speeds of the sieve wheel in a trouble-free manner.

In order to possibly achieve an even better cleaning result depending on the melt being used, according to the invention the back flushing occur in the back-flushing station not only during rotation of the sieve wheel, but rather at least also occasionally during standstill of the sieve wheel.

As a result, it is possible, for example, to continue back flushing or to already perform back flushing shortly after completion of the rotation or before commencement of rotation in order to thus achieve even more optimum cleaning of the mesh inserts during transition between two rotation steps.

The controller increases at least the cleaning-agent pressure relative to the pressure profile during the rotation of the sieve wheel (1) parallel to the start-up process for the rotation of the sieve wheel (1).

In this way, freeing of the sieve wheel that is sticking or tilting in the housing as a result of the preceding standstill is facilitated. The peak load of the rotary drive is reduced as a result of the freeing during starting of rotation, and a lower-performance, more cost-effective rotary drive can be used that is also more cost-effective to operate.

The object underlying the present invention is achieved in terms of the apparatus by a sieve-wheel filter for high-viscosity melts with pressures of >10 bar and temperatures of >90° C., with a sieve wheel holding mesh inserts, and a drive associated with the sieve wheel, as well as with a back-flushing station and a back-flush nozzle embodied as a slit nozzle downstream from a cleaning-agent supply in the direction of flow of the cleaning agent, in that a controller is provided that is capable of adjusting the quantity and/or the pressure and/or the flow speed of the cleaning agent via the cleaning-agent supply as a function of the temporal course of the rotation of the sieve wheel and/or as a function of the rotational speed of the sieve wheel and/or as a function of a differential pressure prevailing on or in the mesh insert located in the melt conduit, and that the effective opening of the slit nozzle is at least equal in its radial dimension to that of a mesh insert located in the back-flushing station, and that the effective angular width of the slit nozzle normal to the radial is smaller than the path traveled by the sieve wheel during an operation step.

By virtue of the inventive construction of the slit nozzle, all of the regions of a mesh insert along its radial extent are passed over by the nozzle, whereas the dimension normal to the radial dimension is formed narrow so that the pressure of the cleaning agent built up in the cleaning-agent supply ensures optimum cleaning of the filter insert.

In this regard, it is worthy of emulation if the slit nozzle has a radial length corresponding to the radial dimension of the mesh inserts to be cleaned and an angular width of 5 mm, or an angular width that corresponds to <7% of the radial length of the slit nozzle. Upon rotation of the filter insert, new regions of the filter insert are always moved upstream of the slit nozzle, thus enabling optimum cleaning during rotation.

It has proven advantageous for a pawl drive that engages on the periphery of the sieve wheel to be associated with the sieve wheel.

For one, the sieve wheel can be driven quickly via the pawl drive. For another, relatively large angles of rotation per drive segment can be achieved, and optimum cleaning of the mesh inserts is ensured despite the quick exchanging of the mesh inserts in the melt conduit. This also enables an especially good response to surge contaminants occurring in the melt conduit. A quick exchange of the fouled mesh inserts with simultaneous optimum cleaning of the mesh inserts to be rotated into the melt conduit ensures a highly variable operation of the sieve-wheel filter that is capable of reacting to all possible contamination situations.

Nonetheless, commensurately large angles of rotation can also be achieved by a toothed wheel of a motor engaging on the periphery of the sieve wheel or through gearing coupled therewith or a freewheel driven by a lifting cylinder.

BRIEF DESCRIPTION OF THE DRAWING

The invention is described in further detail with reference to a drawing.

SPECIFIC DESCRIPTION OF THE INVENTION

The FIGURE is a schematic view of a sieve wheel 1 in which two mesh inserts 2 and 2' are shown to represent a large number of mesh inserts. The mesh inserts 2 are set between bars 3, 3', 3" resting against the inner wall of a sieve-wheel filter housing. The mesh insert 2 is aligned with a melt conduit 4, and the mesh insert 2' is aligned with a cleaning slot 5 of the back-flushing station. It can clearly be seen that the cleaning slot 5 has a substantially greater radial length than the mesh insert 2' but a substantially smaller angular width perpendicular to the radial direction than the mesh insert 2' and than an angular travel 6 per rotational step.

A controller 7 working with or without feedback has an input 8 for loading parameters and on the other hand receives via a data connection 10 input such as differential pressure, rotational speed, charge state of the cleaning-agent supply 9, etc. The controller 7 can influence the rotary drive 12 and/or the cleaning-agent supply 9 through a control port 12 in a manner according to the invention.

The invention claimed is:

1. A method of operating a sieve-wheel filter for a high-viscosity melt with a pressure of >10 bar and a temperature of >90° C., the filter having:
   a sieve wheel holding mesh inserts;
   a rotary drive associated with the sieve wheel for rotating the wheel;
   a cleaning-agent supply for feeding a cleaning agent to a back-flushing station; and
   a conduit for feeding the high-viscosity melt to a filtering station angularly offset from the back-flushing station
   the method comprising the steps of:
   providing the back-flushing station with a slit nozzle connected to the supply, having a radial length at least equal to a radial dimension of the inserts, and having an angular width;
   rotating the sieve wheel by the rotary drive in steps of an angular dimension greater than the angular width of the slit nozzle such that the mesh inserts set in the sieve wheel are successively passed through the back-flushing station and through the filtering station;
   forcing a stream of cleaning agent from a cleaning-agent supply during rotation of the sieve wheel from the nozzle at a predetermined pressure through the inserts when in the back-flushing station;
   adjusting by a controller connected with the cleaning-agent supply the quantity and/or pressure and/or flow speed of the cleaning agent as a function of the temporal course of the rotation of the sieve wheel and/or as a function of the rotational speed of the sieve wheel and/or as a function of a differential pressure across the mesh insert in the melt conduit; and,
   during start-up of rotation of the sieve wheel, setting a pressure of the cleaning agent in the back-flushing station higher than the predetermined pressure during rotation of the sieve wheel.

2. The method of operating a sieve-wheel filter defined in claim 1, wherein the back flushing in the back-flushing station is carried out during rotation of the sieve wheel and at least occasionally during standstill of the sieve wheel.

3. The method of sieve-wheel filter defined in claim 1, wherein the radial length of the slit nozzle corresponds to the radial dimension of the mesh inserts to be cleaned and the angular width is <5 mm.

4. The method of sieve-wheel filter defined in claim 1, wherein the radial length of slit nozzle corresponds to the radial dimension of the mesh inserts to be cleaned and the angular width corresponds to <7% of the radial length of the slit nozzle.

* * * * *